United States Patent
Jaccard et al.

[11] 4,013,343
[45] Mar. 22, 1977

[54] ELECTRO-OPTICAL DISPLAY ARRANGEMENT WITH STORAGE EFFECT USING A SOLID ELECTROLYTE

[75] Inventors: Pierre-Ernest Jaccard, Bienne; Heinrich Hess, Nidau, both of Switzerland

[73] Assignee: Societe Suisse pour l'Industrie Horlogere Management Services, S.A., Bienne, Switzerland

[22] Filed: Dec. 26, 1974

[21] Appl. No.: 536,578

[30] Foreign Application Priority Data

Jan. 31, 1974 Sweden .................. 741313

[52] U.S. Cl. .................. 350/160 R; 204/195 S
[51] Int. Cl.² .................. G02B 5/23; G02F 1/36
[58] Field of Search ............. 350/160 R; 204/195 S

[56] References Cited
UNITED STATES PATENTS

| | | | |
|---|---|---|---|
| 3,521,941 | 7/1970 | Deb et al. | 350/160 R |
| 3,840,286 | 10/1974 | Kiss | 350/160 R |
| 3,892,472 | 7/1975 | Giglia | 350/160 R |
| 3,971,624 | 7/1976 | Bruesch et al. | 350/160 R |

OTHER PUBLICATIONS

Takahashi et al., J. Electrochemical Soc., vol. 119, No. 12, Dec. 1973, pp. 1607–1612.
Pizzini et al., La Chimica e l'industria, vol. 54, No. 3, Mar. 1972, pp. 224–238.
Paek, U. K., (Chemical Abstracts, vol. 80, No. 31418y, attached as summary), Hwohak Kwa Kongop Vi Chinbo, 12 (4), pp. 402–404, 1972.

*Primary Examiner*—Robert J. Webster
*Attorney, Agent, or Firm*—Griffin, Branigan and Butler

[57] ABSTRACT

The embodiments disclosed are image forming devices and the like with a solid electrolyte laminated between electrodes with the electrodes insulated by transparent, insulating layers in a selected pattern to form the image.

29 Claims, 5 Drawing Figures

ELECTRO-OPTICAL DISPLAY ARRANGEMENT WITH STORAGE EFFECT USING A SOLID ELECTROLYTE

This invention has as its object to provide an electro-optical arrangement for display of information supplied in the form of logic signals by an electronic system which provides electrical control pulses.

Electro-optical arrangements which apply physical, chemical phenomena may permit modification of optical characteristics of a medium through application of an electrical magnitude controlling thus the interaction with an incident electromagnetic radiation. Such systems permit the direct control of electromagnetic radiation characteristics transmitted, reflected or diffused by the arrangement by means of an electrical signal.

The arrangements belonging to this category each have advantages and disadvantages. Thus Kerr cells and Pockel cells require high voltages and polarized light and exhibit no storage effect. Electro-chromic arrangements using colour centres as for example the alkaline halides have low electrical conductivity at ambient temperatures and in general their switching time is too long for present day applications.

Electrochemical arrangements are known which use a liquid electrolyte such as an appropriate salt in an organic or inorganic solvent from which one obtains by electrolysis for example a metallic deposit on an electrode or more generally a colour change owing to an oxydation or reduction of one or more ion types in the electrolytic solution. Apart from the chemical and geometric complexity of such arrangements they have a further disadvantage of using a liquid which must be held in a sealed enclosure. Furthermore, if the control voltage is too high the risk exists of causing undesirable and irreversible reactions at the electrodes as for instance the decomposition of the liquid solvent with release of gas to produce an excessive pressure in the container which may lead to electrolyte leakages. Although it has been proposed to add a gelling agent to the liquid electrolytes, this doesn't eliminate the danger of decomposition, and problems may thus arise from osmotic diffusion which will limit the life of the arrangement.

There is also known an electronic arrangement utilizing a type of glass which has available ions for oxydation and reduction reactions (French Pat. No. 1,511,769). Although this arrangement eliminates some problems of the liquid electrolyte systems it poses new problems of its own. Effectively, the arrangement in question cannot be controlled by a potential of a few volts and display a good range of optical density while at the same time be switched in one second or thereabouts except at a temperature of at least 200° C. For utilization at ambient temperatures (−10° C to +60° C) a higher control potential is necessary in view of the lowering of the ionic conductivity. The switching time becomes too long for the arrangement to be useful and several active layers must be deposited to obtain a sufficient range of variation of optical density. This arrangement furthermore has the disadvantage of requiring the use of a P-N junction to prevent electronic conduction across the active layer.

Solid electrolyte technology has made considerable progress during the last few years and we are proposing solid materials having an crystalline structure for which the ionic conductivity at ambient temperature is compatible to that of the known liquid electrolytes, but the use of which is considerably simplified.

For this reason this invention has for its object an electro-optical display arrangement using a solid electrolyte exhibiting a storage effect operating at ambient temperature eliminating the need for a P-N junction, thus exhibiting a rapid change of appearance functioning with an electric potential in the order of 1 or 2 V and having a low power consumption and for which the geometric arrangement is simple and may be realized by known and easy integration techniques.

A further object of the invention is to provide an electro-optical display arrangement comprising elements enclosing a solid electrolyte so as to permit the transport of ions between two electrodes coupled to an electronic control circuit and a reversible deposit of these ions onto a transparent electrode such ions being in a valence state different from that which they normally have when they are in the mass of the solid electrolyte thereby to bring about a visible change in the appearance of the electrode.

For a better understanding of the invention we refer now to the accompanying drawing in which FIG. 1 is a section showing schematically the operating principle of the electro-optic arrangement according to the invention.

Figure 1:
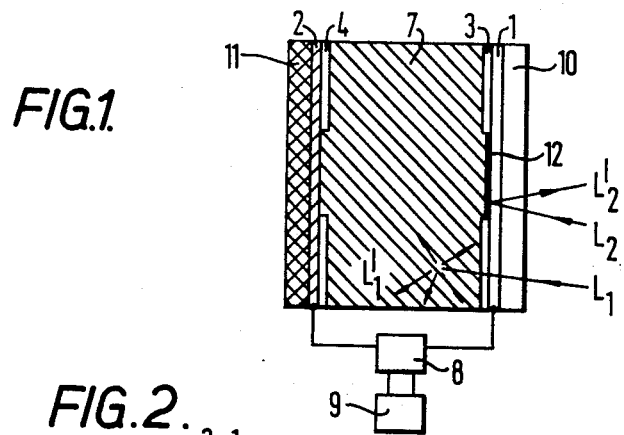

Considering now the several figures it will be seen that the arrangement of the invention comprises an ohmic control electrode 1 which is transparent and chemically inert and which is partially covered by a transparent layer 3 which is likewise chemically inert and is electrically insulating this latter being retained by a rigid transparent support 10 (for example a glass foil). Electrode 1 is coupled to an electronic control circuit 8 energized by a source 9 (power cell). The electronic control circuit 8 is also coupled with a second ohmic control 2 partially covered by an electrically insulating and chemically inert layer 4 and mounted on a rigid support 11. A layer of solid electrolyte 7 supports the two groups of elements described formed on the one hand from layers 1, 3 and 10 and on the other hand from the layers 2, 4 and 11. In the two forms of the invention shown in FIG. 3 and 4 the arrangement additionally comprises control electrodes 5 and 6 immersed in the solid electrolyte 7 located proximate control electrodes 1 and 2 respectively and coupled electrically to the electronic control circuit 8. A further arrangement as shown in FIG. 5 employs additionally a layer of chemical material 13 located between transparent electrode 1 and insulating layer 3. A light source 14 and a reflecting, diffusing or coloured panel 15 may also be associated with the display arrangement. The outer face of the transparent support 10 may be provided with an optical filter which transmits only a portion of the ambient electromagnetic radiation.

The operation of the various arrangements are described hereinafter. In the clear state (no display) light ray $L_1$ from the ambient light passes through the transparent support 10, transparent electrode 1, insulating and transparent layer 3, then is diffused as shown by $L_1$, and partially absorbed by the solid electrolyte 7 which exhibits intrinsically a predetermined absorption band thus giving the arrangement a coloured appearance. One can also add an inert colouring material to the solid electrolyte, such as a metallic oxide or organic colouring material in order to provide the arrangement with a desired appearance. In its clear state the arrangement should give a uniform appearance seen from the front through support 10.

Figure 2:
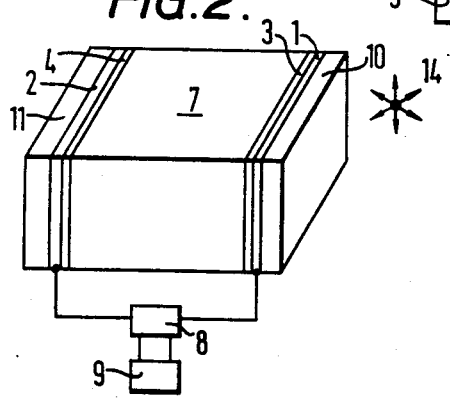
FIG. 2 is a perspective view of a first form of an electro-optic arrangement according to the invention.

To explain a first type of operation reference is made to FIG. 1 and 2. In this manner of operation electrode 2 is an ionic source. Solid electrolyte 7 exhibits a good ionic conduction as will be defined hereinafter. In order to change to the darkened or display state of the arrangement control circuit 8 will apply a voltage between electrodes 1 and 2. If the cathode is considered electrode 1 and the anode electrode 2 electrochemical reactions will take place at the contact surfaces of electrodes 1 and 2 with electrolyte 7 at the areas which are not covered by insulating layers 3 and 4. At electrode 2 atoms M of the material comprising this electrode lose electrons $e^-$ to the control circuit 8 and are ionized according to the reversible reaction:

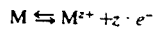

Ions $M^{z+}$ migrate in the solid electrolyte towards the cathode under the influence of the electric field then existing between the anode and the cathode. Thus an electric current flows through the arrangement. At electrode 1 ions $M^{z+}$ of the solid electrolyte 7 combine with electrons $e^-$ provided by the control circuit 8 through the electrode according to the reversible reaction:

The atoms M are deposited on transparent electrode 1 on areas not covered by the insulating and transparent layer 3 so as to form a layer 12 the optical properties of which are different from those of the solid electrolyte 7 and interact with the ambient light ray $L_2$. Such interaction may bring about a partial or total absorption, a diffusion or a reflexion extending from interference to specular reflexion of $L_2$ into $L_2'$. Conducting layer 1 and insulating layer 3 are given geometric forms such that layer 12 may take on an appropriate shape such as a digit or trace, a letter or any other figure desired.

In the darkened state of the arrangement layer 12 is visibly distinguishable from the remaining portion of the arrangement which remains in its clear state.

The electrical potential furnished by control circuit 8 and applied between electrodes 1 and 2 thus produces ionic conduction by migration of ions $M^{z+}$ across the solid electrolyte 7. If this solid electrolyte is a very good conductor the portion of this electrical potential required to cause such migration is very small in comparison with the polarisation potential applied to the contacts of electrodes 1 and 2 of the solid electrolyte 7. Thus it suffices to apply to electrodes 1 and 2 a control voltage slightly exceeding the sum of the polarisation voltages in order to operate the arrangement. FIG. 1 and 2 thus give a schematic view of the principle of this first mode of operation.

Figure 3:
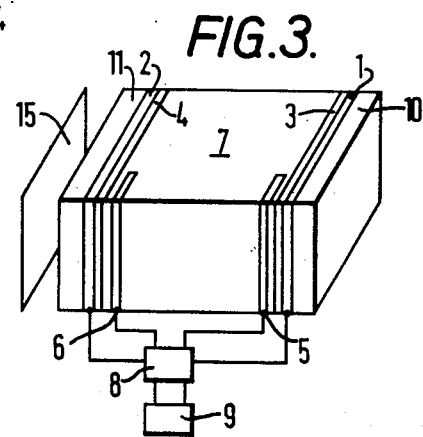
FIG. 3 is a perspective view of a second form of an electro-optic arrangement according to the invention.
Figure 4:
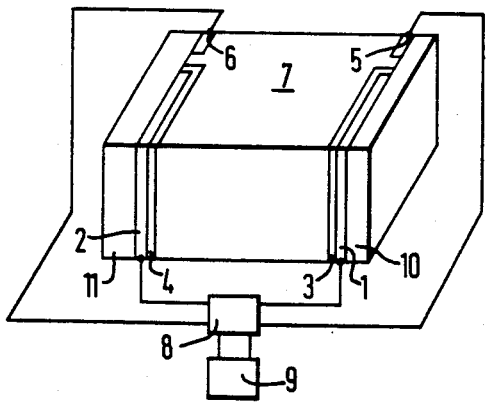
FIG. 4 is a perspective view of a third form of an electro-optic arrangement according to the invention.
Figure 5:
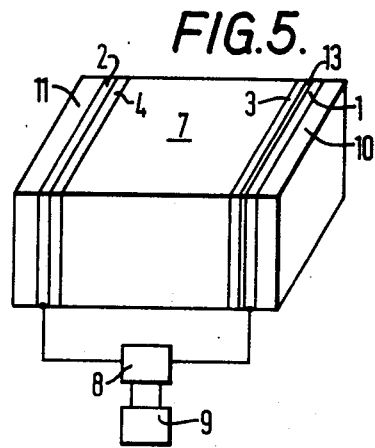
FIG. 5 is a perspective view of a fourth form of an electro-optic arrangement according to the invention.

FIG. 3 and 4 are schematic showings of the second principle of operation. The second mode of operation may be deduced from the first when the ionic conduction of the solid electrolyte is such that the electrical potential necessary to effect migration of ions $M^{z+}$ through the solid electrolyte is comparable to the polarisation voltages at the contact surfaces of the control electrodes 1 and 2 of solid electrolyte 7. The control voltage which is the sum of the voltages applied between electrodes 1 and 2 might then be above the decomposition potential of the solid electrolyte and thus accidentally bring about the decomposition of the latter particularly at the contact surfaces of control electrodes 1 and 2 unless an additional control arrangement is used. To this end reference electrodes 5 and 6 located proximate to control electrodes 1 and 2 are immersed in the solid electrolyte 7 and coupled to a further electronic control circuit incorporated into the control circuit 8. This further circuit enables regulation of the polarisation voltages at the surface contacts of control electrodes 1 and 2 with solid electrolyte 7 then acting on the control voltage.

In the first and second methods of operation hereinbefore described the control voltage applied between electrodes 1 and 2 is removed when layer 12 deposited on transparent electrode 1 has attained the desired optic state. No voltage is then necessary to maintain the darkened state and a short circuit between electrodes 1 and 2 will moreover have no effect since in this state the electro-chemical system existing within the electro-optic arrangement is completely symmetric. The removal of the displayed information i.e. the return to the initial clear state takes place through application of the same electrical control potential to electrodes 1 and 2, but with reversed polarity. In view of the asymmetry of the electrochemical system in the clear state of the arrangement application of an erasing electrical potential between electrodes 1 and 2 inhibits passage of an electric current through the arrangement once layer 12 has been completely removed. This property facilitates control of the complete clearing of the display.

The third method of operation comprises the application of a control potential sufficient to effect a controlled and reversible decomposition of the solid electrolyte, such as must be carefully avoided with a liquid electrolyte in view of the likely gaseous emissions.

An electro-optic arrangement using this latter mode of operation may be realized on the basis of the principle of FIG. 1,2,3,4 or 5, the difference between the first and the second mode of operation being that an electrode 2 is no longer necessarily an ion source, but may be a chemically inert electrode transparent or non-transparent. In the case of a transparent electrode the electro-optic arrangement may by employed to transmit light i.e. light ray $L_1$ may pass through the arrangement so long as solid electrolyte layer 7 is transparent and that support 11 and insulating layer 4 are also transparent just as support 10 and layer 3. An arrangement utilizing this third operating mode may be realized by placing a light source 14 behind support 11 and utilizing the arrangement as an optical shutter. One may also place a reflecting, diffusing or coloured panel 15 behind support 11 whereby the ambient light in front of support 10 fulfills the role of a light source.

Electrolyte 7 contains cations $M^{z+}$ and anions $A^{y-}$. When a sufficient potential is applied between control electrodes 1 and 2 oxidation and reduction reactions take place respectively at the face contacts of the anode and cathode within the solid electrolyte at areas not covered by insulating layers 3 and 4. The cations $M^{z+}$ absorb electrons $e^-$ from the cathod according to the reversible reaction

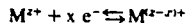

and accumulate in the neighbourhood of the cathode; the anions $A^{y-}$ lose electrons $e^-$ to the anode according to the reversible reaction

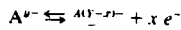

and accumulate in the neighbourhood of the anode. The ion concentrations in the neighbourhood of electrodes 1 and 2 thus obtained have optical properties different from those of the solid electrolyte and interact with the light ray $L_2$ by absorbing, diffusing or reflecting it in $L_2$, for example, thus forming the darkened state of the display.

Such reactions correspond to the charge of an electrochemical battery and represent energy which is stored and may be utilized. The return to the initial clear state of the arrangement is produced through dissipation by means of an electrical connexion between electrodes 1 and 2 of the electrochemical energy accumulated in the arrangement. The erasing process may be accelerated through application of a potential between electrodes 1 and 2 of reversed polarity and of lower amplitude than that of the decomposition potential of the solid electrolyte in order to avoid a sudden return to the darkened state. In the third mode of operation reference electrodes 5 and 6 may be used to assure that the potential drops necessary for the controlled decomposition of the solid electrolyte take place at the contact faces of control electrodes 1 and 2 with the electrolyte 7 and thus assure that there is no decomposition during the erasure phase.

In a further variant transparent electrode 1 is made up with a transparent or non-transparent layer 13 of a conducting or semi-conducting material which reacts chemically or electro-chemically in a reversible manner with the products deposited on this electrode so as to form a coloured compound.

In the various modes of operation transformation from the clear or darkened state and vice versa is obtained through application of a control pulse having an amplitude and duration suited to the substance forming the electrolyte and to the mode of operation used. The return to the preceding state is obtained through application of a pulse of opposite polarity to that preceding. The arrangement remains in the state to which it has been placed without the necessity of continuing to apply a potential until the time that a further electric pulse is applied to it. Thus the arrangement provides a storage or memory effect.

In all the several variants of the invention an appropriate treatment of the transparent rigid support 10 or transparent electrode 1 (for example frosting the surface) enables one to change the appearance of the deposit 12 on electrode 1.

The solid electrolyte plays the role of a membrane which selectively conducts ions, i.e. it enables migration of certain varieties of ions under the effect of an exterior electric field without electronic conduction. Contrary to known arrangement using liquid electrolytes solidified through addition of a gel, the present invention as a principal characteristic employs an inherently solid electrolyte which may be amorphous or crystalline formed by evaporation under vacuum, by sintering or by any other appropriate means and exhibits intrinsically an atomic structure corresponding to that of solid bodies. The solid electrolyte used in the arrangement may be formed of one or several juxtaposed layers or different mixtures of chemical bodies belonging to one or more of the classes listed hereinafter:

1. the class of conductors of metallic ions as for example the family of beta-alumina, particularly Ag-beta-alumina, Na-beta-alumina, Na-beta''-alumina, Li-beta-alumina;

2. the class of halides in particular halides of silver, copper and lithium as for instance AgI, AgBr, $CuBr_2$, LiI;

3. the class of metal halides substituted in variable proportions in particular the following subclasses:
   a. silver halides with substitution of anions and responding to the general formula $n$ AgX.$m$ AgA, as for example $Ag_3SI$, $Ag_3Br$, $Ag_7I_4PO_4$, $Ag_{19}I_{15}P_2O_7$, $Ag_3ISeO_4$, $Ag_3ISO_4$, $Ag_6I_4WO_4$;
   b. silver halides with substitution of cations and responding to the general formula $n$ AgX.$m$ MX, as for example $RbAg_4I_5$, $KAg_4I_5$, $NH_4Ag_4I_5$, $K_xRb_{1-x}Ag_4I_5$, $K_xCs_{1-x}Ag_4I_5$;
   c. silver halides with substitution of cations by organic derivatives of ammonium as for example diethyldimethylammonium-$Ag_6I_7$, tetramethylammonium-$Ag_6I_7$, hexamethonium-$Ag_{12}I_{14}$;
   d. silver halides with a mixed substitution of cations and anions and responding to the general formula $n$ AgX.$m$ MA, as for example, $KAg_4I_4CN$, $RbAg_4I_4CN$, $Ag_6HgS_2I_6$;
   e. silver halides substituted according to the preceding examples (a) to (d) in which the silver is again partially or totally replaced by another cation, in particular by copper as for example $RbCu_xAg_{4-x}I_5$.

The present invention is not limited to the above-mentioned compositions, but encompasses all solid bodies of which the atomic arrangement into a repetitive structure permits incorporation of one or several species of ions of which the migration under the effect of an electric field produces an ionic conduction at ambient temperature for a very low electronic conduction.

The crystalline or amorphous structure of the solid electrolyte is not modified by the migration of ions therethrough. Effectively in the $RbAg_4I_5$ for example the rubidium ions $Rb^+$ and the iodine $I^-$ form a structure allowing channels which may accomodate silver cations $Ag^+$ in a large number of different crystalline sites weakly united giving thus a good ionic conduction by migration of cations $Ag^+$ under the effect of an exterior electric field. Electrode 1 (or 1 and 2 according to the mode of operation) has as its main function the conduction of electrons between the contact surfaces of the layer of solid electrolyte 7 and the electronic circuit 8. It must thus exhibit a good electronic conductivity of ohmic character. It must, moreover be transparent in at least a portion of the visible domain of electromagnetic radiation in order to permit observation of the display. Furthermore, it must be formed of a material which is inert in contact with the electrolyte 7. These several conditions may be fulfilled by various materials for example a thin film of a noble metal such as platinum, tantalum, niobium, palladium or by a semi-conducting material such as stannous oxide $SnO_2$, indium oxide $In_2O_3$, a layer formed from a mixture of two oxides or by a mixture of stannous oxide $SnO_2$ doped with antimony.

The chemical material forming layer 13 employed in conjunction with the transparent and inert electrode 1 may be a chemical compound, electronic conductor, belonging to the class of charged transferring compounds which may be defined as systems comprising two components, one of which is an electron donor (typically an aromatic polycyclic composition) and the other acting as an electron acceptor (typically a halogen). The compounds iodine-perylene (I$_2$-P) and iodine-benzidine (I$_2$-B) are such materials. The compound (I$_2$-P) for example may be employed in conjunction with a mixture of AgI and perylene P according to the reversible reaction:

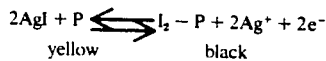
$$2AgI + P \rightleftarrows I_2 - P + 2Ag^+ + 2e^-$$
yellow — black in an electro-optic display arrangement using RbAg$_4$I$_5$ as solid electrolyte.

Ohmic electrode 2 apart from its role as electron conductor between the control circuit 8 and the surface of the solid electrolyte 7 must in the first and second mode of operation supply directly or indirectly ions to electrolyte 7. Such functions may be performed for example through the use as electrode 2 of a leaf of pure metal for which the atoms once ionized provide an ionic conduction throughout the electrolyte 7. One can also utilize a rigid substrate electrically conductive, chemically inert, transparent or non-transparent on which is deposited a thin film of pure metal. The metal to be used depends on the electrolyte used and can be silver, sodium, lithium, copper or an alloy or mixture of these metals among themselves or with further elements. The rigid conducting support may be formed in the same fashion and of the same materials as electrode 1 deposited onto a rigid substrate as for example a glass foil.

The insulating layers 3 and 4 which are chemically inert and which may or may not be transparent have as a principle role to limit the portions of electrodes 1 and 2 which come into contact with the electrolyte 7. They may be formed from a thin film of oxide or nitride of a metal or a metalloid, of an alkaline earth fluoride or of an organic product. Some typical examples are SiO, SiO$_2$, TiO$_2$, Al$_2$O$_3$, Si$_3$N$_4$, CaF$_2$, MgF$_2$.

The reference electrodes 5 and 6 immersed in the solid electrolyte 7 must exhibit a stable electric contact potential with the electrolyte 7. Accordingly, this leads to the use of materials which provide an oxidation reduction pair (redox) with one of the ions of the solid electrolyte 7, such pair exhibiting a stable electromotive force. A practical arrangement comprises the use as material forming reference electrodes 5 and 6 of the same metal or alloy containing the same metal as that utilized for electrode 2. In the specific case where the solid electrolyte contains silver ions Ag$^+$ there is suggested the use of thin silver wires (FIG. 3) or silver deposits on rigid supports 10 and 11 (FIG. 4) as reference electrodes 5 and 6.

A liquid tight container enclosing the assembly arrangement may be used to maintain particular conditions of humidity, pressure, vacuum or specific atmosphere necessary to proper functioning of the arrangement. The enclosure is provided with leads so as to permit electrical connexions between the electronic control circuit 8 and the display.

According to the type of energy source used (dry cell for example) the electronic control circuit may include means for varying the voltage so as to enable transformation of the voltage at the source to the control voltage necessary for the display arrangement.

In a practical example not intended to be limiting the display may be formed initially from a glass foil forming support 10 provided with an electrically conducting and transparent layer of indium oxide and tin forming electrode 1; onto this latter an insulating layer of silicon dioxide having a thickness of 0.1 to 100 μm is deposited by chemical vapour deposition or by sputtering methods. Next the solid electrolyte 7 formed by a layer of RbAg$_4$I$_5$ having a thickness of from 10 to 1000μm is deposited by vacuum evaporation methods to a thickness of 0.1 to 100 μm and then a film of silver forming electrode 2 is likewise deposited by vacuum evaporation methods. Rigid support 11 is not essential in this example of the invention. An enclosure sealed under vacuum so as to be liquid tight to the glass foil 10 encloses the arrangement and may provide the electric leads necessary between the display and the control circuit 8. An optical filter removing blue and ultraviolet light may be placed on the subface of glass foil 10.

A control voltage less than 0.5 V will suffice to operate this arrangement which will cause a deposit of silver 12 to appear on a clear background. The outer surface of support 10 is frosted in order to remove or prevent the mirror effect which might otherwise come from the metallic deposit 12. The application thereof of a reversed polarity voltage of the same magnitude will disperse the deposit 12 and the arrangement will once again appear clear.

What we claim is:

1. An electro-optical display arrangement with storage effect adapted to be activated by an electronic control circuit comprising a voltage source, said display arrangement comprising a first element and a second element positioned on opposite sides and enclosing a system which includes at least one solid crystalline electrolyte of a type which enables the selective transport of ions through the application of an electrical control signal between two control electrodes in contact with the solid crystalline electrolyte, at least one of said electrodes being transparent to light in the visual domain of electromagnetic radiation, said first element comprising a transparent one of said electrodes and comprising between said electrode and said solid electrolyte a transparent electrical insulator at selected portions leaving a potentially visible pattern defined by locations at which said electrode is electrically in contact with said solid electrolyte, said second element comprising the other of said electrodes, the said two control electrodes being adapted to be electrically coupled to the said electronic control circuit to thereby bring a reversible accumulation of ions in the neighbourhood of the control electrode of said first element, such ions being in a valence state different from that of the ions elsewhere in the solid electrolyte sufficient to bring about a visible change in the appearance of the display as viewed through said first element.

2. Display arrangement according to claim 1 also comprising said control circuit and wherein the control voltage provided by the control circuit is less than the decomposition voltage of the solid electrolyte.

3. Display arrangement according to claim 1 also comprising said control circuit and wherein the control voltage provided by the control circuit is above the decomposition voltage of the solid electrolyte, but is provided to a lesser extent than would result in irreversible decomposition of said electrolyte.

4. Display arrangement according to claim 1 also comprising said control circuit and where the control voltage provided by the control circuit causes decomposition of at least one of the solid electrolytes.

5. Display arrangement according to claim 1 wherein at least one of the solid electrolyte constituents is a conductor for metallic ions selected from the group consisting of Ag-beta-alumina, Na-beta-alumina, Na-beta''-aluminum or Li-beta-alumina.

6. Display arrangement according to claim 1 wherein at least one of the solid electrolyte constituents is a metal halide selected from the group consisting of AgI, AgBr, $CuBr_2$ or LiI.

7. Display arrangement according to claim 6 wherein the silver cation is at least partially replaced by a copper cation.

8. Display arrangement according to claim 1 wherein at least one of the solid electrolyte constituents is a silver halide of which the anion is partially substituted so as to conform to a general formula $nAgX.mAgA$, wherein A represents at least one.

9. Display arrangement according to claim 8 wherein said solid electrolyte is selected from a group consisting of $Ag_3SI$, $Ag_3SBr$, $Ag_7I_4PO_4$, $Ag_{19}I_{15}P_2O_7$, $Ag_3ISeO_4$, $Ag_3ISO_4$ or $Ag_6I_4WO_4$.

10. Display arrangement according to claim 8 wherein the silver cation is at least partially replaced by a copper cation.

11. Display arrangement according to claim 1 wherein at least one of the constituents of the solid electrolyte is a silver halide of which the cation is partially substituted so as to satisfy the general formula $nAgX.mMX$ wherein M represents at least one cation.

12. Display arrangement according to claim 11 wherein the substituted silver halide is selected from the group consisting of $RbAg_4I_5$, $KAg_4I_5$, $NH_4Ag_4I_5$, $K_xRb_{1-x}Ag_4I_5$, $K_xCs_{1-x}Ag_4I_5$, diethyldimethylammonium-$Ag_6I_7$, tetramethylammonium-$Ag_6I_7$ or hexamethonium-$Ag_{12}I_{14}$.

13. Display arrangement according to claim 11 wherein the silver cation is at least partially replaced by a copper cation.

14. Display arrangement according to claim 13 in which said solid electrolyte comprises $RbCu_xAg_{4-x}I_5$.

15. Display arrangement according to claim 1 wherein at least one of the solid electrolyte constituents is a silver halide for which the anion and the cation are partially substituted so as to satisfy the general formula $nAgX.mMa$, wherein the M and A represent respectively at least one cation and one anion.

16. Display arrangement according to claim 15 wherein the substituted silver halide is selected from the group consisting of $KAg_4I_4CN$, $RbAg_4I_4CN$ or $Ag_8Hg_2I_6$.

17. Display arrangement according to claim 15 wherein the silver cation is at least partially replaced by a copper cation.

18. Display arrangement according to claim 1 wherein a coloured material is added to at least one of the solid electrolyte constituents.

19. Display arrangement according to claim 1 wherein a transparent control electrode is chemically inert and is formed by a layer of semi-conducting material selected from the group consisting of stannous oxide $SnO_2$, indium oxide $In_2O_3$, a mixture of the aforementioned oxides, or stannous oxide $SnO_2$ doped with antimony.

20. Display arrangement acccording to claim 1 wherein at least one of the control electrodes is deposited onto a rigid support, said support being transparent in a portion of the visible domain of electromagnetic radiation and the electrode and its support being treated so as to give the layer of ions which accumulates in the neighbourhood of said electrode an appearance different from that of a mirror.

21. Display arrangement according to claim 1 wherein the transparent control electrode comprises material which reacts in a reversible manner to form a coloured compound with the ions accumulating in the neighbourhood of such electrode.

22. Display arrangement according to claim 21 wherein said material which reacts to form a coloured compound comprises a material selected from the group of charged transferring compounds consisting of iodine-perylene or iodine-benzidine.

23. Display arrangement according to claim 1 wherein one of the control electrodes provides a source of ions and is formed of a metal selected from the group consisting of silver, sodium, lithium, copper or alloys of these metals among themselves and with further elements, the metal being in the form of a thin film deposited on a rigid, chemically inert substrate, the other electrode being transparent and comprising a foil covered by a layer of a material selected from the group consisting of platinum, tantalum, niobium, palladium, stannous oxide $SnO_2$, indium oxide $In_2O_3$, a mixture of the latter two, or of stannous oxide $SnO_2$ doped with antimony.

24. Display arrangement according to claim 1 wherein said electrical insulator at selected portions comprises an electrically insulating and chemically inert film.

25. Display arrangement according to claim 24 wherein the electrically insulating and chemically inert film is formed by a material selected from the group consisting of oxides and nitrites of a metal or metalloid, or alkaline earth fluorides.

26. Display arrangement according to claim 25 wherein said film comprises a material selected from the group consisting of SiO, $SiO_2$, $TiO_2$, $Al_2O_3$, $Si_3N_4$, $CaF_2$ and $MgF_2$.

27. Display arrangement according to claim 1 wherein at least one reference electrode independent of the control electrodes and adapted to be electrically coupled to the control circuit is immersed in the solid electrolyte system, said reference electrode being preferably formed of a material providing an oxidation reduction pair (redox) with one of the ions of the solid electrolytes, which pair exhibiting a stable electromotive force.

28. Display arrangement according to claim 1 including a surrounding liquid-tight enclosure provided with leads to permit connexion with the electronic control system.

29. Display arrangement according to claim 1 wherein there is provided an optical filter operatively positioned between said first element and a location of normal viewing of said first element.

* * * * *

UNITED STATES PATENT AND TRADEMARK OFFICE
CERTIFICATE OF CORRECTION

PATENT NO. : 4,013,343
DATED : March 22, 1977
INVENTOR(S) : Pierre-Ernest Jaccard and Heinrich Hess It is certified that error appears in the above—identified patent and that said Letters Patent are hereby corrected as shown below:

In the heading of the patent, under "Foreign Application Priority Data,"

for: Jan. 31, 1974 Sweden...741313 read: Jan. 31, 1974 Switzerland...... 1313/74

Signed and Sealed this twelfth Day of July 1977

[SEAL]

Attest:

RUTH C. MASON
*Attesting Officer*

C. MARSHALL DANN
*Commissioner of Patents and Trademarks*